(12) United States Patent
Kim

(10) Patent No.: US 11,355,781 B1
(45) Date of Patent: Jun. 7, 2022

(54) SOLID-STATE ELECTROLYTES AND SOLID-STATE ELECTROCHEMICAL CELLS HAVING SOLID-STATE ELECTROLYTES

(71) Applicant: WATTRII, INC., Cedar Park, TX (US)

(72) Inventor: Jangwoo Kim, San Marcos, TX (US)

(73) Assignee: WATTRII, INC., Cedar Park, TX (US)

( * ) Notice: Subject to any disclaimer, the term of this patent is extended or adjusted under 35 U.S.C. 154(b) by 0 days.

(21) Appl. No.: 17/341,678

(22) Filed: Jun. 8, 2021

(51) Int. Cl.
  *H01M 6/04* (2006.01)
  *H01M 10/0565* (2010.01)
  *H01M 4/66* (2006.01)
  *H01M 4/38* (2006.01)

(52) U.S. Cl.
  CPC ....... *H01M 10/0565* (2013.01); *H01M 4/381* (2013.01); *H01M 4/661* (2013.01)

(58) Field of Classification Search
  CPC ... H01M 10/0565; H01M 4/381; H01M 4/661
  See application file for complete search history.

(56) References Cited

U.S. PATENT DOCUMENTS

2020/0014060 A1* 1/2020 de Souza ............... H01M 4/62
2021/0230763 A1* 7/2021 Kozicki .................. C25D 3/46

* cited by examiner

*Primary Examiner* — Jane J Rhee
(74) *Attorney, Agent, or Firm* — Raven Patents, LLC; Anton E Skaugset

(57) ABSTRACT

Solid-state electrochemical cells including a solid-state electrolyte, where the solid-state electrolyte includes one or more dendrites formed on and/or in the solid-state electrolyte material. The dendrites of the solid-state electrolyte include a metal-containing compound that in turn includes oxygen and/or sulfur.

21 Claims, 7 Drawing Sheets

SOLID-STATE ELECTROLYTES AND SOLID-STATE ELECTROCHEMICAL CELLS HAVING SOLID-STATE ELECTROLYTES

TECHNICAL FIELD

This disclosure relates generally to batteries, and more specifically to solid-state batteries including solid-state electrolytes, where the solid-state electrolyte includes a plurality of dendrite structures.

BACKGROUND

Batteries, or electrochemical cells, are ubiquitous in modern technology, being used in a wide range of applications from small electrochemical systems for industrial and medical devices, to larger electrochemical systems for electric vehicles and grid energy storage systems.

Perhaps the most well-known and widely-used battery technology at the present are lithium-ion batteries, which generally include one or more electrochemical cells, each electrochemical cell including two electrodes (e.g., positive, negative), a typically liquid electrolyte, and often a separator between the electrodes.

An alternative battery technology includes lithium-metal batteries. Lithium-metal batteries are similar to lithium-ion batteries, but include a negative electrode, and electrode active material, of lithium metal. Unfortunately, using lithium metal as a negative electrode can result in the formation of lithium metal dendrites, which grow as lithium ions are reduced to lithium metal and deposit at the ends of the forming dendrites. The conductive lithium metal dendrite will continue to extend until the end of the dendrite makes an electrical connection with a surface of the positive electrode material, resulting in a short-circuit of the battery.

What is needed is an alternative battery that provides increased performance as well as enhanced safety.

SUMMARY

The solid-state batteries of the present disclosure provide low interfacial charge transfer resistance and/or low grain boundary resistance, which is similar to that of lithium-ion batteries formed using a conventional liquid electrolyte. However, the use of a solid, rather than a liquid, electrolyte reduces safety hazards associated with the use or storage of lithium batteries. Use of the disclosed solid electrolyte can additionally result in batteries exhibiting one or more of higher energy density, higher power density, longer cycle life, reduced costs, and enhanced temperature performance, compared to other lithium-ion batteries, and particularly to other solid-state lithium-ion batteries.

The present disclosure may include solid-state electrolytes that include a solid-state electrolyte material having one or more dendrites formed on and/or in the solid-state electrolyte material, where the one or more dendrites comprises a metal-containing dendrite material, where the metal-containing dendrite material additionally includes oxygen and/or sulfur.

The present disclosure may include solid-state electrolytes that include a solid-state electrolyte material that is a metal-containing material having an ionic conductivity of greater than or equal to $10^{-8}$ S/cm and an electrical conductivity of less than or equal to $10^{-3}$ S/cm; wherein the solid-state electrolyte further comprises one or more dendrites formed on and/or in the solid-state electrolyte material; where the one or more dendrites comprise a dendrite material that includes an alkali metal, an alkaline earth metal, or an amphoteric metal; and further includes at least one of oxygen and sulfur.

The present disclosure may include solid-state electrochemical cells that include an electrode comprising an electrode active material, and a solid-state dendritic electrolyte, including a solid-state electrolyte material and including one or more dendrites formed on and/or in the solid-state electrolyte material; where the one or more dendrites include a metal-containing compound that further includes at least one of oxygen and sulfur, and the solid-state dendritic electrolyte is in contact with the electrode.

The disclosed features, functions, and advantages of the disclosed apparatus, systems, and methods may be achieved independently in various embodiments of the present disclosure, or may be combined in yet other embodiments, further details of which can be seen with reference to the following description and drawings.

BRIEF DESCRIPTION OF THE DRAWINGS

The drawings are not necessarily drawn to scale. The dimensions of some of the elements in the figures may be exaggerated relative to other elements to help improve understanding of illustrated embodiments of the present disclosure.

DETAILED DESCRIPTION

Figure 1:
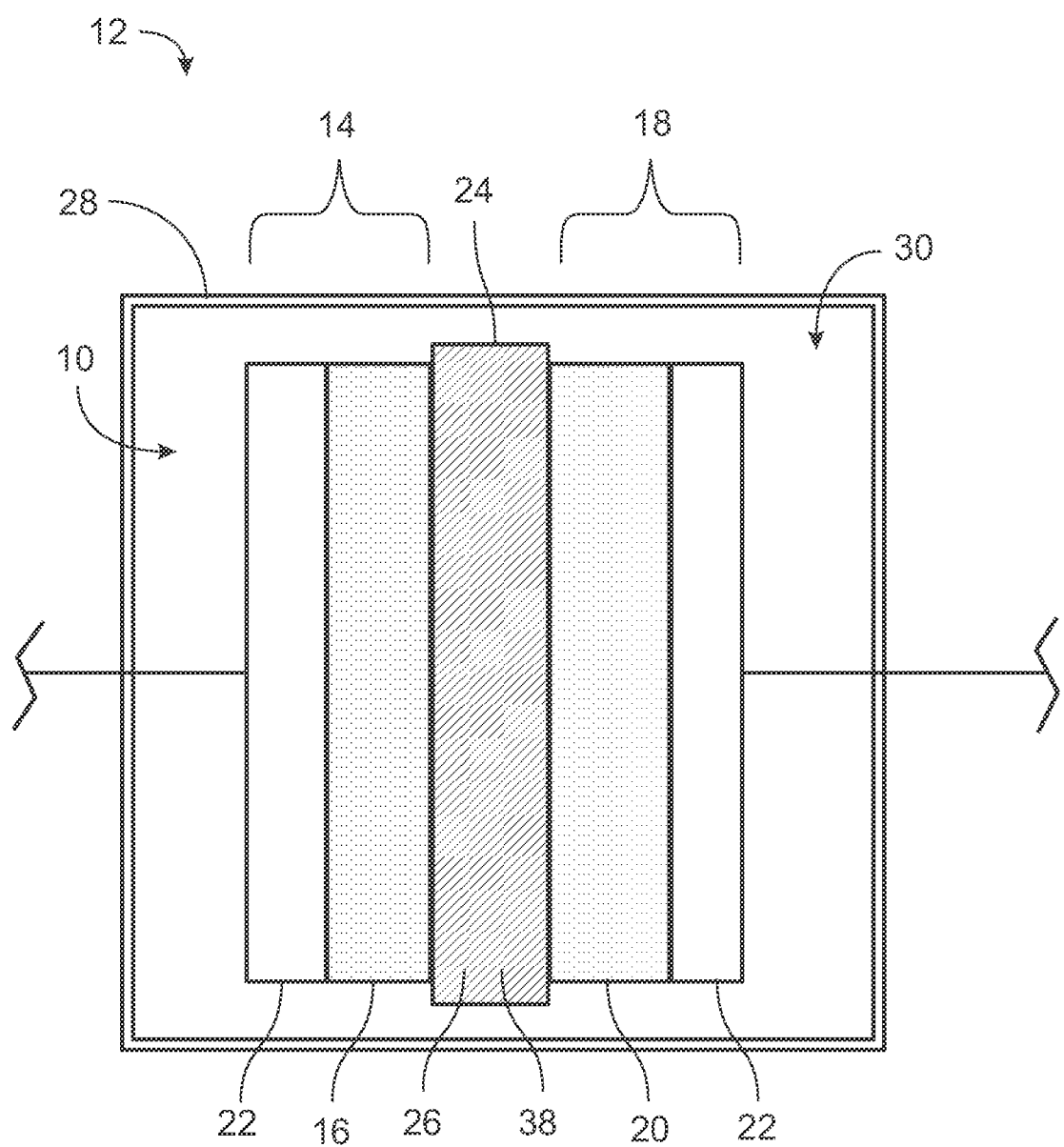
FIG. 1 is a semi-schematic diagram of an illustrative solid-state battery that includes an exemplary electrochemical cell according to the present disclosure.

The solid-state batteries of the present disclosure include one or more electrochemical cells that include a solid-state dendritic electrolyte, and that can exhibit several advantageous properties such as higher energy densities, higher power densities, longer cycle life, reduced costs, and enhanced temperature performance, compared to lithium-ion batteries, and particularly compared to other solid-state lithium-ion batteries.

The following definitions apply herein, unless otherwise indicated.

"Electrode active material" refers to the portion or component of an electrode that participates in reactions by transporting ions through an electrolyte and/or electrons through an external circuit.

"Current collector" refers to the component adjacent to an electrode configured to convey current from a fixed to a moving portion of the circuit of the electrochemical cell, or vice versa.

"Electrolyte" refers to a material that provides for ion transport within an electrochemical cell. An electrolyte acts as a conduit for ion transport through its interaction with an electrode.

A "full lifecycle of the electrochemical cell" is intended to mean that the life of the electrochemical cell is considered to have exceeded its normal useful life, which is assumed here to be the point at which the cell shows 80% of its original capacity for the first time.

"Electrospraying," also known as electrospinning, is a thin film production method that employs electric force to draw and apply charged threads of organic solutions or organic melts.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" may be used to distinguish or identify various members of a group, or the like, and are not intended to show serial or numerical limitation.

Unless they relate to specific examples, all specifications regarding quantities and portions, particularly those for delimiting the invention, indicate a ±10% tolerance, for example: 11% means: from 9.9% to 12.1%. For terms such as "a solvent", the word "a" is not to be regarded as a numerical word but as an indefinite article or as a pronoun, unless the context indicates otherwise.

The term: "combination" or "combinations" means, unless otherwise stated, all types of combinations, starting from two of the relevant constituents, to a plurality or all of such constituents.

U.S. application Ser. No. 17/175,267 filed Feb. 12, 2021 discloses HIGH-ENERGY CATHODES AND METHODS FOR MAKING THE SAME; U.S. application Ser. No. 17/220,823 filed Apr. 1, 2021 discloses HIGH-ENERGY CATHODES AND METHODS FOR MAKING THE SAME; and U.S. application Ser. No. 17/306,457 filed May 3, 2021 discloses an ELECTROCHEMICAL CELL INCLUDING A GREENHOUSE GAS; each application is hereby incorporated by reference in their entirety for all purposes.

The present disclosure is directed to solid-state batteries. A battery is a power source that includes one or more electrochemical cells combined with external connections for supplying power to electrical devices such as flashlights, mobile phones, and electric cars. A solid-state battery is a battery that incorporates at least one solid-state electrochemical cell. A solid-state electrochemical cell is an electrochemical cell that incorporates a solid-state electrolyte.

It should be appreciated that while the descriptions of various embodiments in the disclosure are written in terms of describing a single solid-state electrochemical cell, similar principles may be applied to an assembly that includes more than one solid-state electrochemical cell (such as, for example, electrochemical cell packs, and the like). Such multiple-cell assemblies should be understood to fall within the scope of the present disclosure.

An illustrative solid-state electrochemical cell 10 for a battery 12 is depicted semi-schematically in FIG. 1. Electrochemical cell 10 includes an electrode 14 that may be a positive electrode or a negative electrode, preferably a positive electrode, where electrode 14 can further include an electrode active material 16. Electrochemical cell 10 may further include an additional electrode 18 that includes an additional electrode active material 20.

If electrode 14 is a negative electrode, additional electrode 18 can be a positive electrode, and vice versa. Either electrode 14 or additional electrode 18, or both, can include a current collector 22 that is in electrical contact with that electrode. The current collector that is in contact with the negative electrode is referred to as the negative electrode current collector, while the current collector in contact with the positive electrode is referred to as the positive electrode current collector.

Electrochemical cell 10 further includes a solid-state electrolyte 24 that includes a solid-state electrolyte material 26. The components of solid-state electrochemical cell 10 are typically held within a housing (i.e., battery case) 28, which encloses the battery components, and can keep the battery components under a desired gas composition or liquid composition 30. Solid-state battery 12 can have the form of a button cell, a pouch cell, a prismatic cell, a cylindrical cell, a flow cell, in alternating plates, or in jelly rolls, among others.

Electrolyte

An electrolyte is a material that provides for ion transport within an electrochemical cell of a battery. The electrolyte acts as a conduit for ion transport through its interaction with the electrodes. Upon charging of the battery, the electrolyte facilitates the movement of ions from the positive electrode to the negative electrode, whereas upon discharge, the electrolyte facilitates the movement of ions from the negative electrode to the positive electrode. In rechargeable batteries, the electrolyte promotes ion cycling between the negative and positive electrodes.

Solid-state electrolyte 24 includes a solid-state electrolyte material 26 that is a solid material at normal temperature and pressure (NTP). Solid-state electrolyte material 26 is ionically conductive, by which is meant that solid-state electrolyte material 26 has an ionic conductivity of greater than or equal to $10^{-10}$ S/cm and an electrical conductivity of less than or equal to $10^{-1}$ S/cm. Preferably, solid-state electrolyte material 26 (and therefore solid-state electrolyte 24) has an ionic conductivity of greater than or equal to $10^{-8}$ S/cm and an electrical conductivity of less than or equal to $10^{-3}$ S/cm. In one embodiment, solid-state electrolyte 24 has an ionic conductivity of greater than or equal to $10^{-7}$ S/cm.

Solid-state electrolyte 24 of electrochemical cell 10 may have any conformation that permits solid-state electrolyte 24 to function as an electrolyte within the cell. For example, solid-state electrolyte 24 can have a substantially planar conformation, such as for example a film, a foil, a tape, a paper, a sheet, or a layer, among others.

In one embodiment of the present disclosure, solid-state electrolyte 24 includes an electrosprayed solid-state electrolyte film that includes the desired solid-state electrolyte material 26 and a polymeric material, as described below. Such electrosprayed solid-state electrolyte films can include more than 70 wt. %, preferably more than 80 wt. %, more preferably more than 90 wt. % of the solid-state electrolyte material described herein.

Solid-state electrolyte material 26 can include one or more of polymers, glass, phosphates, fluorophosphates, carbonates, amines, borates, fluoroborates, halides, halates, oxohalides, oxides (e.g., $SiO_2$, $TiO_2$, $Al_2O_3$, $Y_2O_3$, $Mg_2B_2O_5$, $Li_2O$, $LiOH$, $Li_2O_2$, $Li_2CO_3$, $P_2O_5$, $GeO_2$, $AlPO_4$, $Li_2Ti_3O_7$), perovskites, antiperovskites (e.g., $Li_3OBr$, $Li_3OCl$, $Li_2OHBr$, $Li_2OHCl$), LISICON-type electrolytes (e.g., $Li_{1+x+y}Al_xTi_{2-x}(PO_4)_3$, $Li_{2+2x}Zn_{1-x}GeO_4$, $Li_{(3+x)}Ge_xV_{(1-x)}O_4$, $Li_{(4-x)}Si_{(1-x)}P_xO_4$, $Li_{1+x+y}Al_xTi_{2-x}Si_yP_{3-y}O_{12}$, $Li_{1+x}Al_xGe_yTi_{2-x-y}P_3O_{12}$, $Li_{1+x+3y}Al_x(Ge,Ti)_{2-x}(Si_yPO_4)_3$, $Li_{14}ZnGe_4O_{16}$, $Li_{4-x}V_xGe_xO_4$), garnets (e.g., $Li_7La_3Zr_2O_{12}$, $Li_{7-x}La_3Zr_{2-x}Nb_xO_{12}$, $Li_7La_{3-x}Ca_xZr_{2-x}Nb_xO_{12}$, $Li_{6+x}La_3Zr_{1+x}Ta_{1-x}O_{12}$), sulfides (e.g., $Li_6PS_5Cl$, $Li_{9.54}Si_{1.74}P_{1.44}Si_{1.7}Cl_{0.3}$, $Li_{10}GeP_2S_{12}$, $Li_7PS_6$, $Li_7P_3S_{11}$, $Li_{3.25}P_{0.95}S_4$, $Li_{3+x}Ge_xP_{1-x}S_4$), thio-LISICON type electrolytes (e.g., $Li_{(4-x)}Ge_{(1-x)}P_xS_4$), oxynitrides, nitrides, or the like (LISICON is an acronym for Lithium Super Ionic CONductor).

In one embodiment, solid-state electrolyte material 26 includes a metal-containing material having an ionic conductivity of greater than or equal to $10^{-8}$ S/cm and an electrical conductivity of less than or equal to $10^{-3}$ S/cm. In another embodiment, solid-state electrolyte material 26 includes a lithium-containing material having an ionic conductivity of greater than or equal to $10^{-8}$ S/cm and an electrical conductivity of less than or equal to $10^{-3}$ S/cm.

Solid-state electrolyte 24 is typically modified to include one or more, or a plurality of, dendrites 32, where a dendrite is a branching, treelike structure growing on and/or in solid-state electrolyte 24. The branching structures of dendrites 32 typically form via the crystallization of a metal compound, or a metal complex onto or into solid-state electrolyte 24. The structure of a dendrite 32 can include a plurality of individual crystalline domains, which may include the same or different metals, metal compounds, or metal complexes. Preferably, the growth of dendrite 32 creates a branching, tree-like structure that includes at least one branch having an aspect ratio (length divided by diameter/thickness) of greater than or equal to 0.1, preferably greater than or equal to 1, more preferably greater than or equal to 10.

Figure 2A:
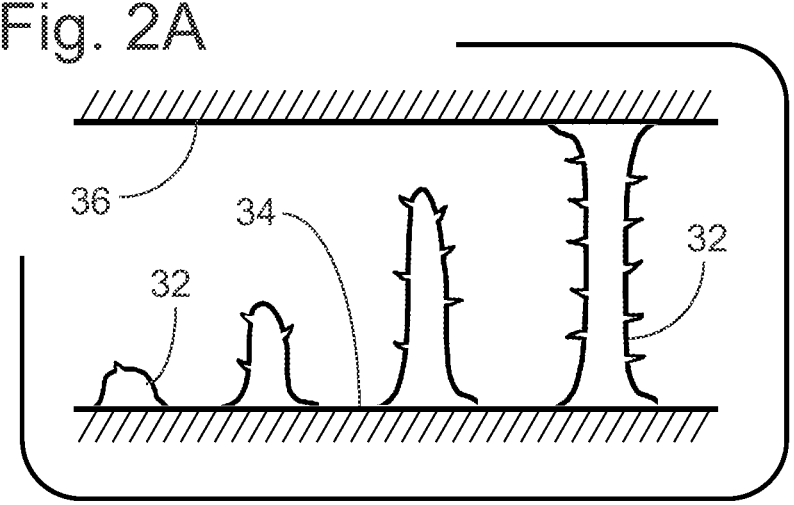
FIGS. 2A-2C depict the morphology of various illustrative dendrites according to the present disclosure.
Figure 2B:
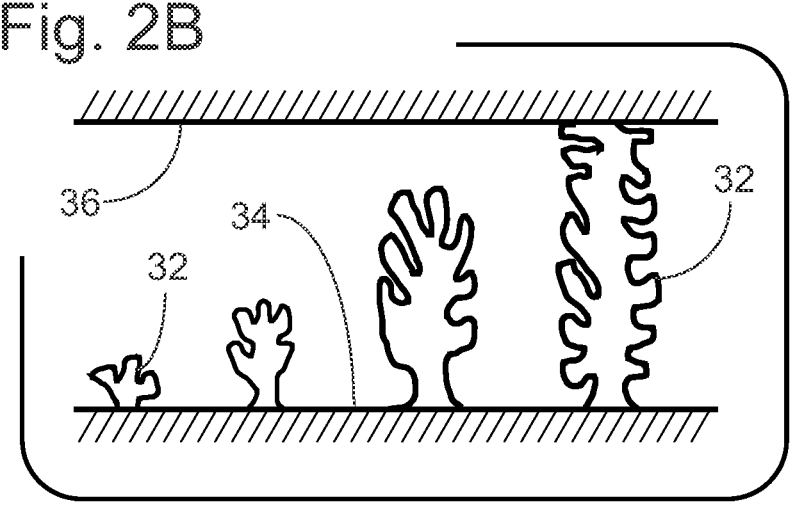
Figure 2C:
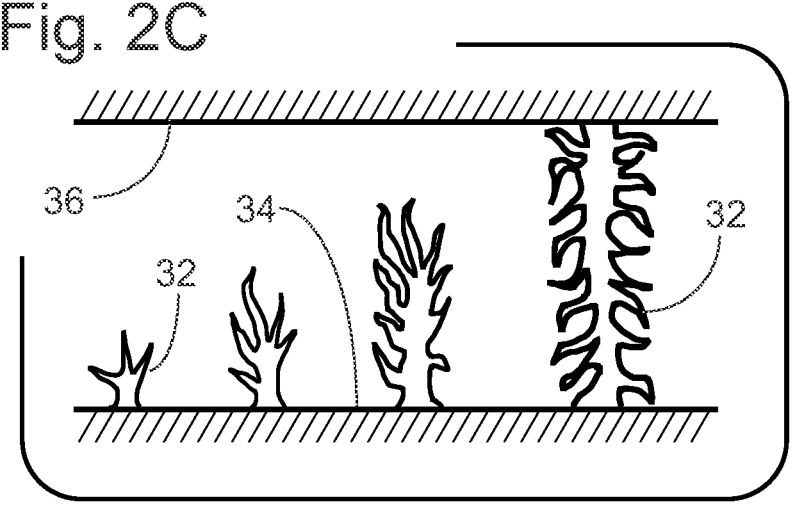

Solid-state electrolyte 24 may include a plurality of dendrites 32, where the dendrites may have any suitable dendrite morphology, or structure. Individual dendrites 32 can exhibit a variety of dendrite structures, while still generally remaining branching and tree-like. For example, each of FIGS. 2A-2C provides a semi-schematic view of the stages of growth of a different dendrite morphology extending from a surface 34, which can be a surface of electrolyte 24, for example. As shown in FIG. 2A, dendrites 32 can exhibit a "cactus-type" dendrite structure, having a large central prominence, or trunk, with several much smaller and possibly needle-like branches extending from the central prominence. Alternatively, as shown in FIG. 2B, dendrites 32 can exhibit a "moss-type" dendrite structure, having a more organic form and including more rounded branches, without such a clearly defined central trunk. Alternatively, as shown in FIG. 2C, dendrites 32 can exhibit a "branch-type" dendrite structure, which includes the organic overall form of the "moss-type" dendrites, but having branches that are better-defined, extend further, and may be relatively more pointed (needle-like) than the moss-type dendrites.

In each of FIGS. 2A-2C, dendrites 32 are shown in various stages of growth, from formation of an initial dendrite structure (on the far left) to a mature dendrite structure (on the far right) that has extended outwardly from surface 34 far enough to create a bridge between surface 34 and second surface 36, which can be a surface of an electrode, a current collector, or other electrochemical cell component. In the case of a typical lithium-based battery, once a metallic dendrite has extended across such a gap, the dendrite would form an electrical connection (or short) between those two surfaces. In the case of the solid-state electrolytes of the present disclosure, such an electrical connection is not formed even if a dendrite 32 extends across the gap and forms a bridge between the two surfaces.

The plurality of dendrites 32 on and/or in solid-state electrolyte 24 can include any of the dendrite structures shown, or combinations thereof, or mixtures thereof. The particular structures of dendrites 32 present on/in the solid-state electrolytes of the present disclosure are typically dependent upon the materials used to form the dendrites, the gas or liquid composition surrounding the electrolyte material during dendrite formation, and the conditions within the electrochemical cell during dendrite formation (temperature, pressure, etc.).

While dendrites have been previously observed forming in conventional lithium-ion or lithium-metal batteries, in those cases the dendrites are composed of pristine metals, and their presence can be detrimental to various aspects of battery performance. In contrast, the dendrites of the present disclosure can include metal compounds and metal complexes (e.g., metal oxides, metal sulfides, among others) such that when present on/in solid-state electrolyte 24 the dendrites can confer beneficial effects onto various aspects of battery performance.

The dendrites of solid-state electrolyte 24 can include a metal-containing compound (for example a metal complex), where the metal may include an alkali metal (e.g., lithium, sodium, potassium), an alkaline earth metal (e.g., magnesium, calcium), or an amphoteric metal (e.g., beryllium, aluminum, zinc, tin, lead). The metal compound may also include one or both of oxygen or sulfur. Where the metal compound includes oxygen, the resulting material can be less reactive with the environment than for analogous sulfide compounds. The dendrites of the present disclosure are typically ionically conductive and electrically insulating. Typically, the dendrites have an ionic conductivity of greater than or equal to $10^{-10}$ S/cm and an electrical conductivity of less than or equal to $10^{-1}$ S/cm. Preferably, the dendrites have an ionic conductivity of greater than or equal to $10^{-8}$ S/cm and an electrical conductivity of less than or equal to $10^{-3}$ S/cm. More preferably, the dendrites have an ionic conductivity of greater than or equal to $10^{-7}$ S/cm and an electrical conductivity of less than or equal to $10^{-4}$ S/cm.

The dendrites of the present disclosure may be electrochemically and/or chemically formed on and/or in solid-state electrolyte 24 using a suitably reactive gas. Without wishing to be bound by theory, it is believed that dendrites tend to form and grow where there is a physically weaker spot in the solid electrolyte and/or where there is a physically vacant spot on the electrolyte. Each dendrite 32 may stem from electrode active material 16 or 20, and may have at least one branch extending in a direction substantially perpendicular to one or both of the negative electrode current collector and the positive electrode current collector. Each dendrite 32 may be in contact with electrode 14, additional electrode 18 and/or a current collector 22.

The presence of dendrites 32 on and/or in solid-state electrolyte 24 can lower interfacial charge transfer resistance and/or grain boundary resistance of the electrochemical cell incorporating the electrolyte. Alternatively, or in addition, the action of the reactive gases can add electroactive functional groups to the surface of the electrode materials, and/or redesign the chemical structure of the electrode materials. Such a redesign of the electrode materials may contribute to the resulting electrochemical cell being capable of storing more energy per a unit mass, or per area of the electrode.

Solid-state electrolyte 24 can include a polymeric material, where the polymeric material can be electrically and/or ionically insulating. The polymeric material may have an ionic conductivity of less than or equal to $10^{-7}$ S/cm and can form part of the electrolyte and/or one or both electrodes. The polymeric material can include, for example, one or more of polyethylene oxide, polycaprolactone, poly acrylic acid, poly methyl methacrylate, polytetrafluoroethylene, poly vinylidene fluoride, polyacrylonitrile, polyethylene terephthalate, polyvinylpyrrolidone, and poly(4-vinylpyridine), in any combination. Solid-state electrolyte 24 can have a composition that is between about 0.01 wt. % and about 30 wt. % polymeric material, preferably about 0.1 wt. % and about 20 wt. % polymeric material, and more preferably about 1 wt. % and about 10 wt. % polymeric material.

Solid-state electrolyte material 26 can include a composition of solid particles. When present, the average particle size of such a composition can vary from about 5 nm to about 30 μm, and can exhibit an average pore size of about 0.1 nm to about 500 nm. Typically, the average particle size or diameter of solid-state electrolyte material 20 is less than about 30 μm. Preferably, the average particle size of solid-state electrolyte material 20 is greater than about 10 nm and less than about 20 μm. More preferably, the average particle size of solid-state electrolyte material 20 is greater than about 20 nm and less than about 10 μm. Where solid-state electrolyte material 20 includes a composition of solid particles, the average pore size of solid-state electrolyte material 20 may be less than about 500 nm. Preferably, the average pore size of solid-state electrolyte material 20 is greater than about 0.5 nm and less than about 200 nm. More preferably, the average pore size of a solid-state electrolyte material 20 is greater than about 1 nm and less than about 100 nm.

In some embodiments, in addition to solid-state electrolyte material 26, electrochemical cell 10 can further include a non-solid electrolyte that is a liquid, a gel, or a liquified gas.

Electrodes

A positive electrode is an electrode of a battery cell that receives electrons from an external circuit and is reduced during discharging, and transfers electrons to an external circuit through oxidation during charging. A positive electrode can be referred to as a cathode. A negative electrode is an electrode of a battery cell that transfers electrons to an external circuit through oxidation during discharging, and receives electrons from an external circuit and is reduced during charging. A negative electrode can be referred to as an anode.

If electrode 14 is a negative electrode, additional electrode 18 is a positive electrode, and vice versa. Either electrode 14 or additional electrode 18, or both, can include a current collector 22 that is in electrical contact with that electrode. The current collector that is in contact with the negative electrode is referred to as the negative electrode current collector, while the current collector in contact with the positive electrode is referred to as the positive electrode current collector.

Electrode 14 and additional electrode 18, when present, typically include one or more electrode active materials 16, 20, which may be the same or different. Electrode active material 16, 20 includes the portion or component of an electrode that participates in electrochemical reactions by transporting ions through an electrolyte and/or electrons through an external circuit, gaining or losing electrons in the course of the electrochemical reactions. Electrode active material 16, 20 may constitute the entirety of the associated electrode, but is typically a component of, or a coating on, the electrode.

Electrode active material 16, 20 can be a starting material, a discharge product or a charge product. For example, in an electrochemical cell where a graphite is used as a negative electrode active material, the graphite ($C_6$) is lithiated during charge and becomes $LiC_6$. Then, during discharge, $LiC_6$ is delithiated and returns to $C_6$. Both $C_6$ and $LiC_6$ are considered an electrode active material. The starting material, the discharge product and the charge product can all be different from one another.

Electrode active material 16, 20 can be generated in situ by the selection of the appropriate components of electrochemical cell 10, such as by selecting the composition of solid-state electrolyte 24 and additional components thereof, optionally followed by the application of a current collector to electrochemical cell 10. The particular composition of electrode active material 16, 20 is not particularly critical, and any electrode active that can store and release ions can be an appropriate electrode active material for the purposes of this disclosure.

For example, electrode active material 16, 20 can be an alkali metal (e.g., lithium, sodium, potassium), an alkaline earth metal (e.g., magnesium, calcium), an amphoteric metal (e.g., beryllium, aluminum, zinc, tin, and lead), a metalloid (e.g., silicon, silicon oxide, silicon carbide, silicon compound, arsenic, antimony, tin), an inorganic carbon (e.g., graphite, graphene, graphene oxide, activated carbon, carbon nanotube, carbon dot), sulfur, sulfur compound (such as a sulfide, e.g. lithium titanium disulfide (LTS), $MV_{0.5}Ti_{0.5}S_2$, where M is a metal), an oxide (e.g., a material of the form $M_xTi_5O_{12}$, $TiO_2$, $TiNb_2O_7$, $Nb_2O_5$, $M_xVO_4$, $H_2Ti_6O_{13}$, $M_xMnBO_3$, $M_xV_2O_5$, $M_xMoO_4$, $M_xW_2O_7$, $M'_{1-x}M''O_2$, $M'_{1-w}(M''_xM'''_y)O_2$, $M_{1-w}(Mn_xNi_yCo_z)O_2$, $M_{1-w}(Mn_xNi_yCo_zAl_w)O_2$, $M_{1-w}(Ni_xCo_yAl_z)O_2$, $M'_{1-w}(Ni_xCo_yM''_z)O_2$, $M'_{1-w}(Ni_xMn_yM''_z)O_2$, $M''M'''_2O_4$, $M_xV_yO_z$, $M''PO_4$, $M''_xM'''_{1-x}PO_4$, where M', M'', and M''' are different metals, lithium titanate (LTO), lithium iron phosphates (LFP), lithium nickel manganese cobalt oxides (NMC), lithium nickel cobalt aluminum oxides (NCA), lithium cobalt oxides (LCO), lithium nickel oxides (LNO), and lithium manganese oxides (LMO)), among others.

Alternatively, or in addition, electrode active material 16, 20 can include an organic material (e.g., truxenone, truxenone derivatives, phenoxazine, phenoxazine derivatives, phenothiazine, phenothiazine derivatives, quinone, quinone derivatives, diamine derivatives, phenazine, phenazine derivatives, quinoxaline, quinoxaline derivatives, pyrazine, pyrazine derivatives, cyclohexane, cyclohexane derivatives, triazine, triazine derivatives, melamine, melamine derivatives, dimethoxybenzene, dimethoxybenzene derivatives, cyclopropenium derivatives, amide derivatives, amino acid, amino acid derivatives, viologen, viologen derivatives, nitroxide derivatives), halogens, halogen compounds (such as halides), or any combination thereof.

In some embodiments, electrode active material 16, 20 can include one or more organic moieties, where an organic moiety is a fragment or substituent of a larger compound. Where electrode active material 16, 20 includes an organic moiety, it may be derived from an organic compound, as described above. Examples of organic moieties include alkyl groups, alkenyl groups, alkynyl groups, acyl groups, alkylamino groups, and aryl groups, among others. In one aspect, electrode active material includes an organic compound that includes a heteroatom, such as boron, nitrogen, oxygen, sulfur, phosphorous, fluorine, chlorine, and/or bromine, among others. Alternatively, or in addition, electrode active material includes an organic compound that includes one or more aromatic groups. When the electrode active material includes a metal or a metal compound or complex, the metal is preferably an alkali metal or an alkaline earth metal. More preferably the metal is an alkali metal, as such materials can confer the capability to provide high energy density to the resulting electrochemical cell.

In some cases, electrochemical cell 10 can include an electrode or an additional electrode formed by applying an electrode active material to a substrate (for example current collector 22) that does not itself include an electrode active material. The electrode active material can be applied to the substrate by deposition, or by intercalation with the substrate the initial charging or discharging of the electrochemical cell. The electrode can additionally include electrolyte material. The electrode active materials can be mixed with the electrolyte material. In these embodiments, solid-state electrolyte 24 can be positioned with the electrode 14 or 18 and disposed between current collector 22 and the electrode. In some embodiments, current collector 22 corresponds to a housing 28 of electrochemical cell 10.

Electrode active material 16, 20 can be present as a composition of solid particles. The average particle size of an appropriate electrode active material can vary from about 5 nm to about 50 µm, and can exhibit an average pore size of about 0.1 nm to about 1 µm. Preferably, the average particle size of an electrode active material is greater than about 500 nm and less than about 50 µm. More preferably, the average particle size of an electrode active material is greater than about 1 µm and less than about 30 µm. Where electrode active material 16, 20 is present as a composition of solid particles, the average pore size of the electrode active material may be less than about 1 µm. Preferably, the average pore size of an electrode active material is greater than about 1 nm and less than about 500 nm. More preferably, the average pore size of an electrode active material is greater than about 5 nm and less than about 200 nm.

Electrode 14 and additional electrode 18, when present, can include an electrically-conductive material. The electrically-conductive material can include a porous carbon material that includes one or more of carbon black, carbon nanotubes, carbon nanofibers, carbon dots, activated carbon, amorphous carbon, graphite, graphene, graphene oxide, and graphene nanoribbons. Above all, carbon nanotube is preferable for its high aspect ratio and durability. The porous carbon material can be doped with one or more heteroatoms selected from boron, nitrogen, oxygen, sulfur, phosphorous, fluorine, chlorine, and bromine. Above all, nitrogen or fluorine is preferable for allowing lower charge transfer resistance. The electrically-conductive material can also function as electrode active material 16, 20 as long as the electrically-conductive material can store and release ions during operation of electrochemical cell 10. In further aspects and embodiments, the porous carbon material can have the form of particles, powders, paper, foam, fibers, sheets, discs, rods, and/or foils.

An electrically-conductive material useful for electrodes 14, 18 can have an average particle size or diameter of about 5 nm to about 50 µm. Typically, the average particle size or diameter of the electrically-conductive material is less than about 50 µm. Preferably, the average particle size of the electrically-conductive material is greater than about 50 nm and less than about 40 µm. More preferably, the average particle size of the electrically-conductive material is greater than about 500 nm and less than about 30 µm. The electrically-conductive material may have an average pore size of less than about 1 µm. For example, the electrically-conductive material may have an average pore size of about 0.1 nm to about 1 µm. Preferably, the average pore size of the electrically-conductive material is greater than about 1 nm and less than about 500 nm. More preferably, the average pore size of the electrically-conductive material is greater than about 5 nm and less than about 200 nm.

The average particle size or diameter of the particles making up electrode active material 16, 20 and the particles of the electrically-conductive material of electrodes 14, 18 may be inversely correlated. For example, where the average particle size of electrode active material is in the range of about 10 µm to about 50 µm, that of the electrically conductive material can be about 10 nm to about 500 nm, or vice versa. Typically, one or more of the electrode active materials and the electrically-conductive materials include particles with an average particle size or diameter of greater than about 50 nm and less than about 50 µm, preferably greater than about 500 nm and less than about 40 µm, more preferably greater than about 1 µm and less than about 30 µm.

Electrodes 14, 18 of electrochemical cell 10 typically include an electrically-conductive material as a substrate, or as an electrode body, upon or in which an electrode active material and/or a solid-state electrolyte is deposited or formed. Any suitable electrically-conductive material may be used for the disclosed electrodes, which may have the same or different formulation. Electrode active material 16, 20 and/or an electrically-conductive material may be shaped into a planar surface, and/or be a particulate solid. Where the electrode active material, electrically-conductive material, and/or solid-state electrolyte is particulate, the individual particles may have any suitable shape, including spherical, cubic, cuboid, conic, pyramidal, cylindrical, rectangular prismatic, hexagonal prismatic, hemispherical, triangular prismatic, pentagonal prismatic, octagonal prismatic, toroidal, octahedral, and dodecahedral, or any combination thereof, among others.

Electrodes 14, 18 and/or solid-state electrolyte 24 may further include one or more of a polymeric binder, a plasticizer, and a carboxylic acid. Where electrodes 14, 18 include a polymeric binder, the polymeric binder may be present to help form a solid electrode from an electrode active material. An appropriate polymeric binder for the purposes of this disclosure may include one or more of polycaprolactone, poly(acrylic acid), poly(methyl methacrylate), polytetrafluoroethylene, poly(vinylidene fluoride), polyacrylonitrile, poly(ethylene terephthalate), polyvinylpyrrolidone, poly(4-vinylpyridine), polyvinyl chloride, polyvinyl alcohol, polyvinyl acetate, polyethylene, polypropylene, polylactic acid, polyvinyl butyral, polystyrene, polyurethane, polycarbonate, styrene-butadiene-rubber, sodium carboxymethyl cellulose, among others. In a particular embodiment, the polymeric binder includes one of poly (ethylene oxide) (PEO) or poly (vinylidene fluoride).

Where electrodes 14, 18 include a carboxylic acid, the carboxylic acid may be present to facilitate ion transport in and out of an electrode active material of the electrode. When present, the carboxylic acid can be a monocarboxylic acid or a polycarboxylic acid. When the carboxylic acid is a polycarboxylic acid, it may be oxalic acid.

Where electrodes 14, 18 include a plasticizer, the plasticizer includes a material that is added to an organic or polymeric material to make it softer, more flexible, and/or to increase its plasticity. Exemplary plasticizers include, by way of non-limiting example, succinonitrile, glutaronitrile, adiponitrile, ethylene carbonate, propylene carbonate, dimethylformamide, dimethyl sulfoxide, γ-butyrolactone, sulfolane, 3-methyl-2-oxazolidinone, butylene carbonate, phthalate derivatives, trimellitates, adipates, sebacates, maleates, or any combination thereof. In one embodiment, a suitable plasticizer can include succinonitrile.

The electrically-conductive material of the electrode, with additional conductive materials, polymeric binder, and plasticizers, if present, can be applied to a current collector using any suitable application technique. For example, the electrically-conductive material can be cast into a film and then deposited onto the desired current collector.

Current Collector

Each current collector 22 functions as a bridging component that collects the electrical current generated at electrodes 14, 18 and is connected with an external circuit. Each current collector 22 is typically adjacent to its associated electrode. Typically, each current collector is or includes an electrically-conductive material.

Each current collector 22, which may be the same or different, can include any suitable and compatible electrically-conductive material. Current collector 22 may include one or more metals such as alkaline earth metals, transition metals, rare earth metals, post-transition metals, and alkali metals, or any combination thereof. In particular, current collector 22 may include at least one of aluminum, aluminum alloy, copper, copper alloy, silver, silver alloy, nickel, nickel alloy, duplex steel, stainless steel, or any combination thereof. Alternatively, or in addition, current collector 22 can include a metallic current collector that includes one or more of molybdenum, titanium, and zirconium metals or metal alloys. Current collector 22 may be in contact with an electrically-conductive material, for example by being coated with the electrically-conductive material. In this embodiment, the electrically conductive material may be a porous inorganic carbon material that is carbon black, carbon nanotubes, carbon nanofibers, carbon dots, activated carbon, amorphous carbon, microporous carbon, mesoporous carbon, porous carbon, graphite, graphene, graphene oxide, graphene nanoribbons, and mixtures and combinations thereof. In some embodiments, the porous inorganic carbon material can be in the form of particles, powders, rods, or any combination thereof. In particular, current collector can include a freestanding carbon material in the form of a paper, a foam, a felt, a fiber, a film, a sheet, a tape, a cloth, a disc, a string, a foil, or any combinations thereof.

Current collector 22 can be perforated, where the pore size may be about 500 nm or above (e.g., about 500 nm to about 5 mm, preferably about 500 nm to about 1 mm, more preferably about 500 nm to about 200 μm) and the distance between pores can be about 10 μm or more (e.g., about 10 μm to about 10 mm, preferably about 50 μm to about 10 mm, more preferably about 200 μm to about 10 mm).

Separator

In some embodiments, solid-state electrolyte 24 may perform the function of a separator 38 by separating electrode 14 from additional electrode 18 or from the current collector 22 associated with additional electrode 18. Alternatively, electrochemical cell 10 may include an additional separator 38 distinct from solid-state electrolyte 24. Solid-state electrolyte 24 and/or separator 38 (when present) can be larger in their width and length than the one or more current collectors 22 in order to avoid contact between the negative electrode and the positive electrode.

Separator 38, when present, can be in contact with electrode 14, or separator 38 can be in contact with solid-state electrolyte 24. Where electrochemical cell 10 includes additional electrode 18, separator 38 can be disposed between electrode 14 and additional electrode 18. Separator 38 can be larger in one or both of its width and length than current collectors 22, in order to avoid contact between electrode 14 and additional electrode 18, contact between individual current collectors 22, contact between a positive electrode and a negative current collector, or contact between the negative electrode and the positive current collector. Separator 38 can include an electrolyte to provide for ion transport within electrochemical cell 10, and to act as a conduit for ion transport through its interaction with electrode 14 and additional electrode 18.

Separator 38 can be in contact with solid-state electrolyte 24, and may include a polymer material, such as for example a polymer film. When present, the polymer material can be polyethylene, polypropylene, poly(tetrafluoroethylene), or poly(vinyl chloride), among others. Typically, the polymer film, when present, includes polypropylene and/or polyethylene. Alternatively, or in addition, separator 38 can include nonwoven fibers (such as nylon, polyesters, and glass, among others), a glass, a ceramic, or any combination thereof. In some embodiments, separator 38 includes glass fibers. In some embodiments, separator 38 can include a surfactant coating or treatment to enhance the wettability of a liquid-based electrolyte.

Reactive Gas

Electrochemical cell 10 can further include a reactive gas, by which is meant a compound that is a gas at any given temperature or pressure, and that will react chemically or electrochemically with solid-state electrolyte material 26 of solid-state electrolyte 24 or an electrode active material 16, 20 in order to form dendrites 32 on and/or in solid-state electrolyte 24. In an embodiment of the present disclosure, the reactive gas can include compounds having at least one oxygen atom (e.g., $CO_2$, $CO$, $O_2$, $N_2O$, $NO_2$, and $SO_2$) and/or at least one sulfur atom (e.g., $S_8$, $COS$, $CS_2$, $SF_6$, $H_2S$, $SO_2$, $CH_3SH$, $(CH_3)_2S$, and $CH_3CH_2SH$.

Solid-state electrolyte material 26 or dendrites 32 of the present disclosure can be formed or modified by the reactive gas even when it is not in the gas phase. The reactive gas can optionally be liquified under pressure and retained within housing 28 of electrochemical cell 10. The liquified gas can be present in contact with solid-state electrolyte 24 and/or be dissolved in solid-state electrolyte 24. While the reactive gas can be maintained in contact with either or both of electrodes 14, 18, the reactive gas is not intended to be used as an electrode active material.

Preparation of Solid-State Electrochemical Cell

The preparation of solid-state electrochemical cell 10 necessarily includes the preparation of solid-state electrolyte 24, and more specifically, the formation of dendrites 32 on solid-state electrolyte 24. While any method of combining solid-state electrolyte material 26 with the reactive gas that results in dendrite formation on solid-state electrolyte 24 is a suitable method of preparing the solid-state electrolytes of the present disclosure, it may be particularly convenient to form the modified solid-state electrolyte by applying voltage or current to the electrochemical cell incorporating solid state electrolyte 24 in the presence of the reactive gas. That is, electrochemical cell 10 can be assembled, and then the reactive gas can be added to electrochemical cell 10 so that subsequent application of voltage or current results in dendrite formation on the solid-state electrolyte.

By incorporating a reactive gas-rich atmosphere within cell housing 28, non-conventional dendrites 32 can be formed on the surface of electrodes 14 and/or 18 and/or on the surface of solid-state electrolyte material 26 due to a chemical and/or electrochemical reaction. Gases formed during the formation of dendrites 32 can be purged with the selected reactive gas, an alternative (i.e., second) reactive gas, and/or an inert gas. Alternatively, instead of purging the existing gases, the partial pressure of the reactive gas within the housing can be reduced, or the reactive gas can be removed, by applying a vacuum to electrochemical cell 10. It should be appreciated that any of the following methods can optionally further include one or more additional steps of applying voltage or current to electrochemical cell 10 that are performed after the purge step.

The solid-state electrochemical cells of the present disclosure can be prepared by providing an electrochemical cell housing, inserting the desired electrochemical cell components (e.g., the desired electrode, the desired solid-state electrolyte) into the electrochemical cell housing, compressing the selected electrochemical cell components within the electrochemical cell housing, providing the desired reactive gas to the electrochemical cell housing to displace all or a portion of the ambient atmosphere within the electrochemical cell housing, and then sealing the electrochemical cell housing. Alternatively, instead of providing the desired reactive gas, the electrochemical cell housing can be sealed under the reactive gas atmosphere.

In one embodiment, inserting the electrochemical cell components into the electrochemical cell housing can include inserting the electrochemical cell components in the following order: i) A negative current collector, ii) a negative electrode, iii) a solid-state electrolyte (a separator), iv) a positive electrode, and v) a positive current collector. Alternatively, the order of electrochemical cell components can be reversed. The step of compressing the electrochemical cell components should involve careful control of the pressure applied to the electrochemical cell components, so that the electrode and the additional electrode remain clearly separated. The electrochemical cell components can be compressed using for example a press, with a stack pressure of 100 MPa or below (e.g., about 0.1 MPa to about 100 MPa, preferably about 0.5 MPa to about 70 MPa, more preferably about 1 MPa to about 50 MPa). Advantageously, a pressure applied during similar steps described herein can be lower than pressures typically applied to conventional solid-state electrochemical cells during manufacture of the electrochemical cell, where such pressures can be greater than 500 MPa.

As discussed above, solid-state electrochemical cell 10 of the present disclosure optionally includes an electrosprayed solid-state electrolyte film that includes solid-state electrolyte material 26 and/or a polymeric material. One or both electrodes 14, 18 can also optionally include such an electrosprayed material. One or more electrospraying parameters such as flow rate, applied voltage, applied current, nozzle dimension, nozzle type, and distance between the tip of the nozzle and the current collector, among others, can be adjusted to optimize the electrospraying process. Electrospraying can advantageously allow an elongation and thinning of the polymeric material, which may not only strongly bind the electrolyte materials to fabricate a microns-thick freestanding film (e.g., >5 μm) without cracking, but can also cover a surface of solid-state electrolyte materials 26 with a relatively small amount of the polymeric material, compared to traditional application techniques.

Figure 3:
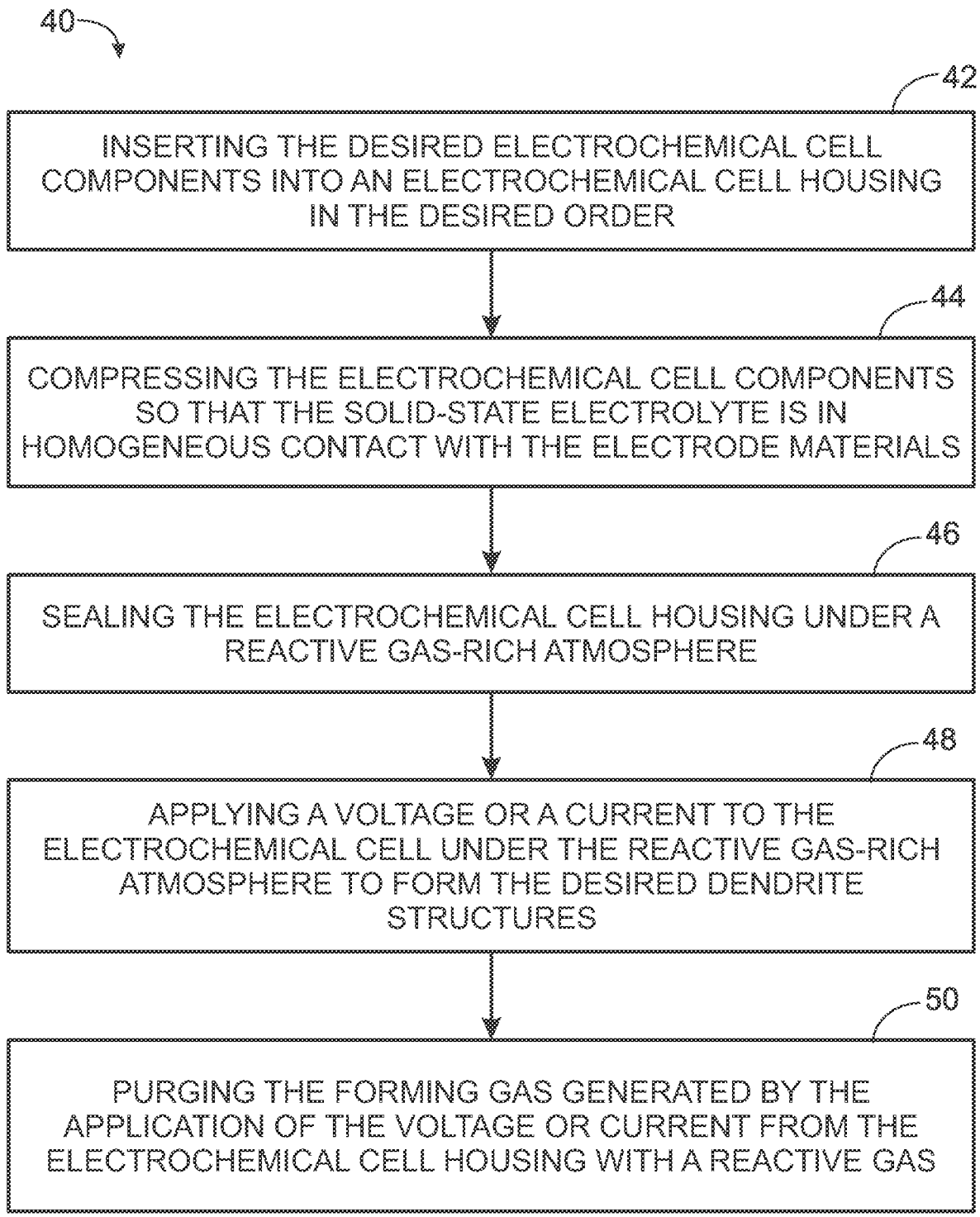
FIG. 3 is a flowchart of an illustrative method of manufacturing an electrochemical cell according to the present disclosure.

An exemplary and illustrative method of fabricating an electrochemical cell according to the present disclosure is shown in flow chart 40 of FIG. 3. The method of flow chart 40 includes inserting the desired electrochemical cell components into an electrochemical cell housing in the desired order, at step 42; compressing the electrochemical cell components so that the solid-state electrolyte is in homogeneous contact with the electrode materials, at step 44; sealing the electrochemical cell housing under a reactive gas-rich atmosphere, at step 46; applying a voltage or a current to the electrochemical cell under the reactive gas-rich atmosphere to form the desired dendrite structures, at step 48; and purging forming gas generated during the application of the voltage or the current from the electrochemical cell housing with a reactive gas, at step 50.

Figure 4:
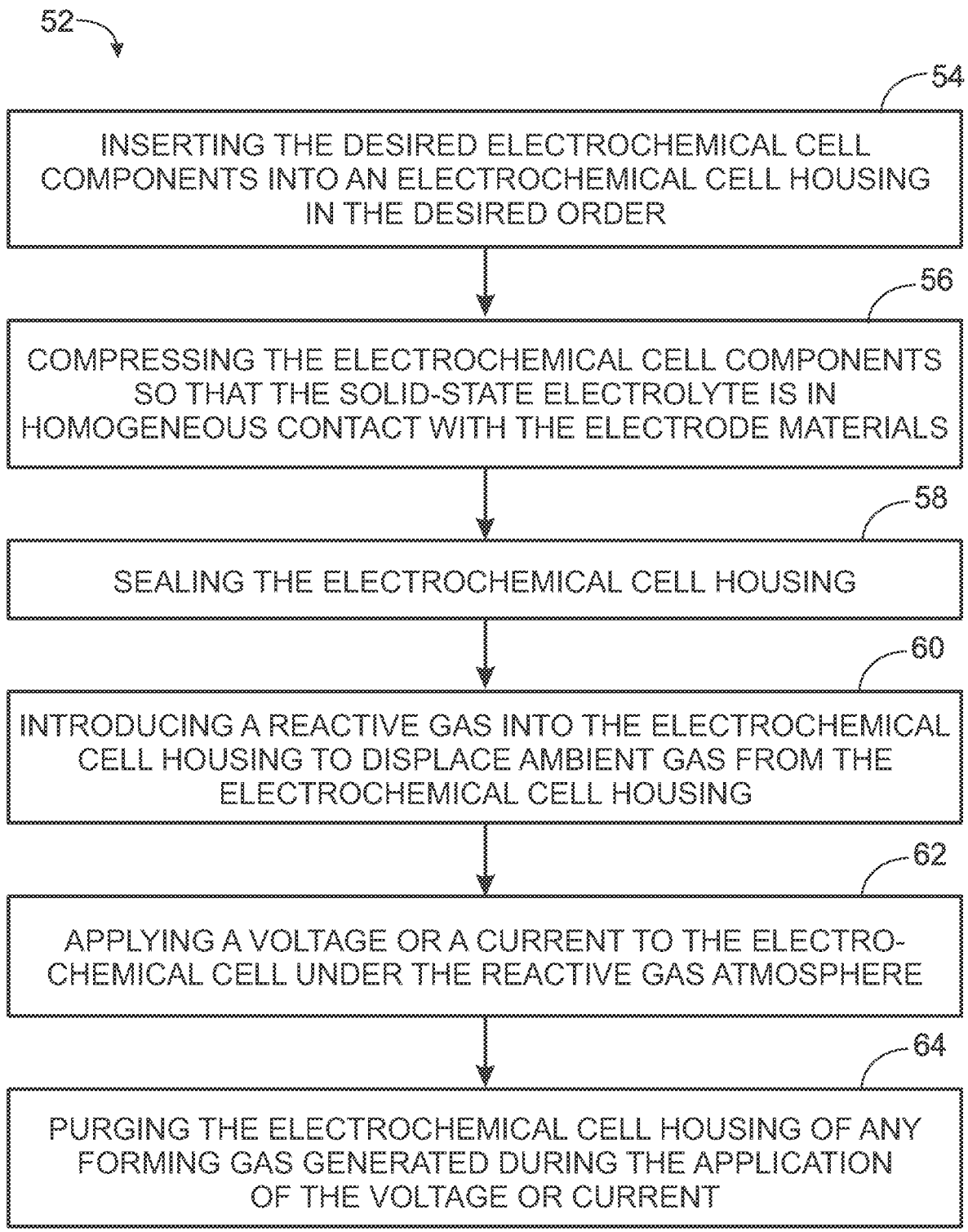
FIG. 4 is a flowchart of an alternative illustrative method of manufacturing an electrochemical cell according to the present disclosure.

An alternative exemplary method of fabricating an electrochemical cell according to the present disclosure is shown in flow chart 52 of FIG. 4. FIG. 4 is a flow chart of an alternative exemplary method of fabricating an electrochemical cell according to the present disclosure. The method of flow chart 52 includes inserting the desired electrochemical cell components into an electrochemical cell housing in the desired order, at step 54; compressing the electrochemical cell components so that the solid-state electrolyte is in homogeneous contact with the electrode materials, at step 56; sealing the electrochemical cell housing, at step 58; introducing a reactive gas into the electrochemical cell housing to displace ambient gas from the electrochemical cell housing, at step 60; applying a voltage or a current to the electrochemical cell under the reactive gas atmosphere at step 62; and purging the electrochemical cell housing of any forming gas generated during the application of the voltage or the current, at step 64.

Figure 5:
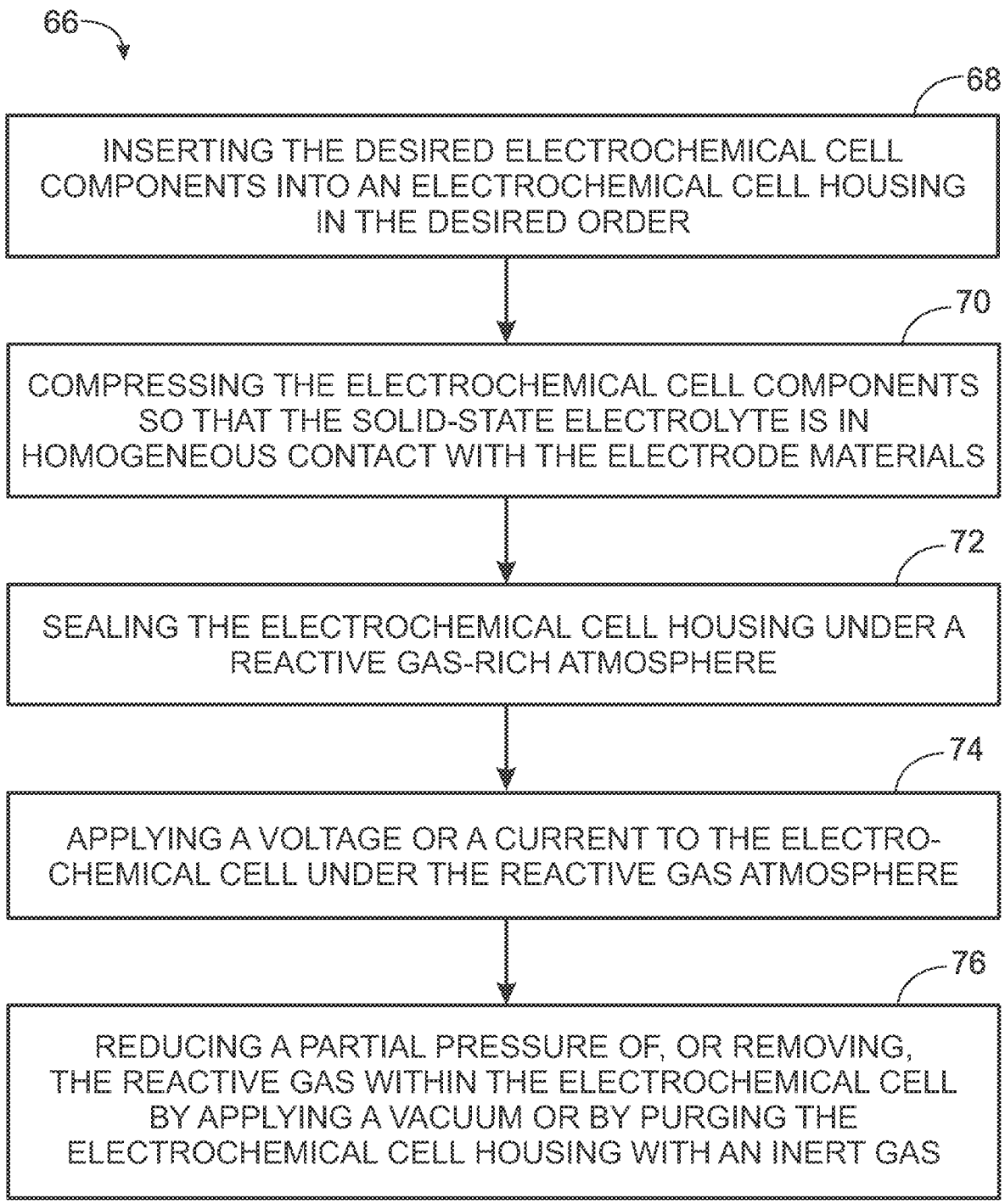
FIG. 5 is a flowchart of an alternative illustrative method of manufacturing an electrochemical cell according to the present disclosure.

An alternative exemplary method of fabricating an electrochemical cell according to the present disclosure is shown in flow chart 66 of FIG. 5. The method of flow chart 66 includes inserting the desired electrochemical cell components into an electrochemical cell housing in the desired order, at step 68; compressing the electrochemical cell components so that the solid-state electrolyte is in homogeneous contact with the electrode materials, at step 70; sealing the exterior electrochemical cell housing under a reactive gas-rich atmosphere, at step 72; applying a voltage or a current to the electrochemical cell under the reactive gas atmosphere, at step 74; and reducing a partial pressure of the reactive gas or removing the reactive gas within the electrochemical cell component stack by applying a vacuum or by purging the electrochemical cell housing with an inert gas, at step 76. In the context of the method of flow chart 66, the partial pressure of the reactive gas within the electrochemical cell component stack may be reduced to less than or equal to 0.9 atm, preferably to less than or equal to 0.5 atm, and more preferably to less than or equal to 0.1 atm.

Figure 6:
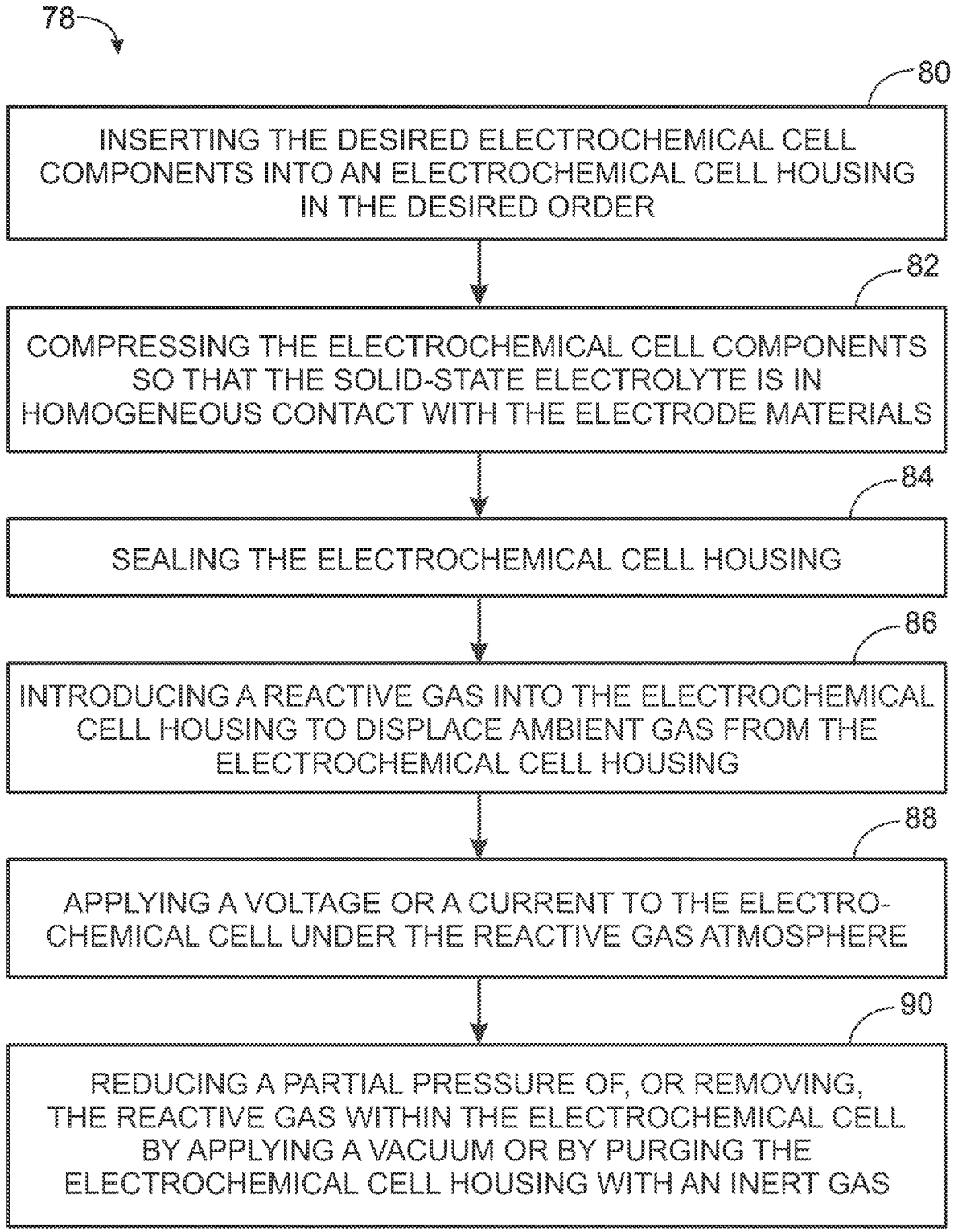
FIG. 6 is a flowchart of an alternative illustrative method of manufacturing an electrochemical cell according to the present disclosure.

An alternative exemplary method of fabricating an electrochemical cell according to the present disclosure is shown in flow chart 78 of FIG. 6. The method of flow chart 78 includes inserting the desired electrochemical cell components into an electrochemical cell housing in the desired order, at step 80; compressing the electrochemical cell components so that the solid-state electrolyte is in homogeneous contact with the electrode materials, at step 82; sealing the electrochemical cell housing, at step 84; introducing a reactive gas into the electrochemical cell housing to displace ambient gas from the electrochemical cell housing, at step 86; applying a voltage or a current to the exterior electrochemical cell housing under the reactive gas atmosphere, at step 88; and reducing a partial pressure of the reactive gas or removing the reactive gas within the electrochemical cell component stack by applying a vacuum or by purging the electrochemical cell housing with an inert gas, at step 90. In the context of the method of flow chart 78, the partial pressure of the reactive gas within the electrochemical cell component stack may be reduced to less than or equal to 0.9 atm, preferably to less than or equal to 0.5 atm, and more preferably to less than or equal to 0.1 atm.

Figure 7:
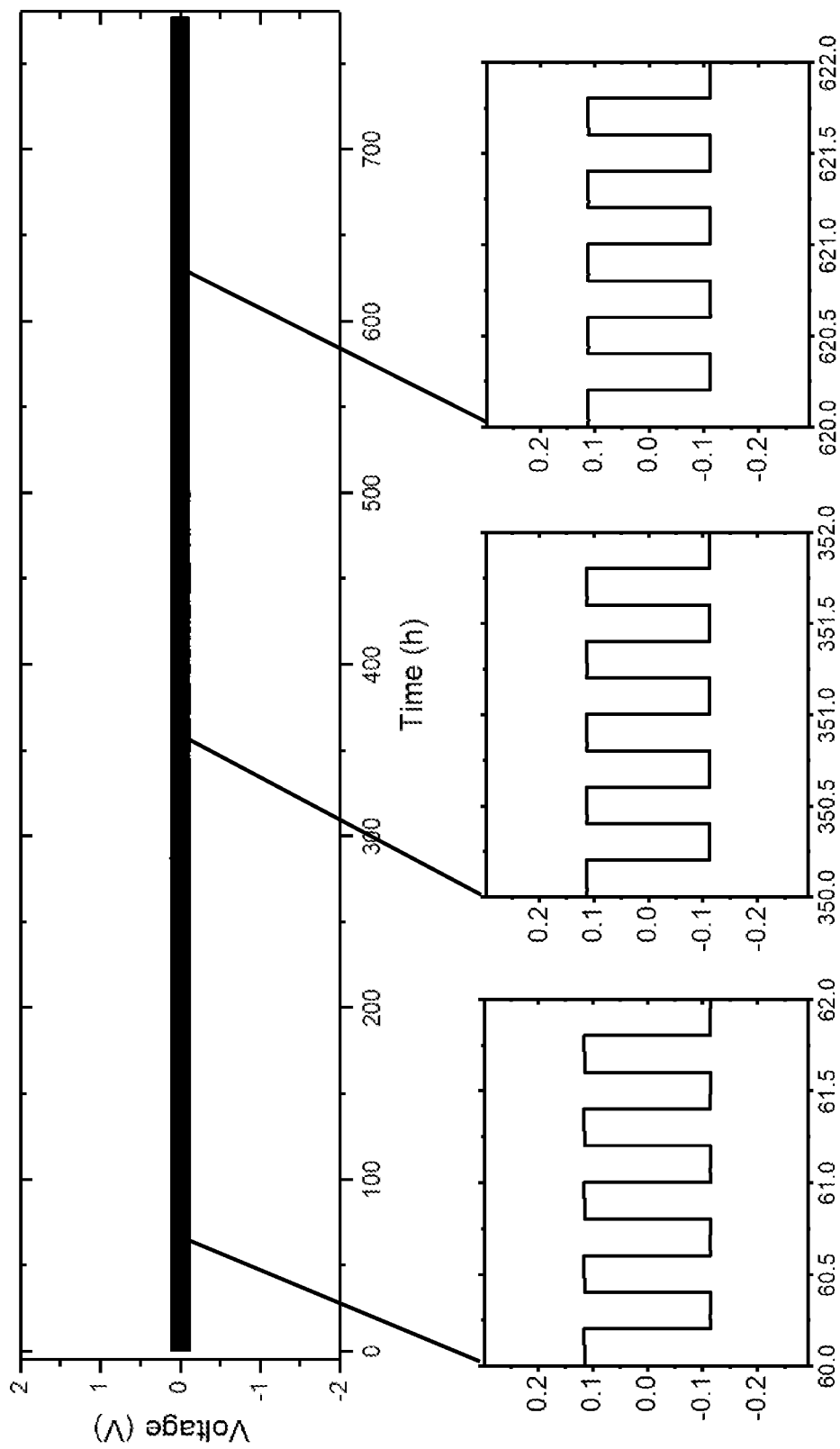
FIG. 7 is a plot illustrating the stable cycle performance of an exemplary symmetrical electrochemical cell including a solid-state electrolyte according to the present disclosure.

FIG. 7 is a graph illustrating the advantageous stable cycle performance of an exemplary symmetrical electrochemical cell including solid-state electrolyte according to the present disclosure. The solid-state electrochemical cell includes lithium metal foils and a solid-state electrolyte formed according to the present disclosure and showed superior cycle performance over 3,500 cycles and 900 hours at room temperature, at a current density of 5 mA/cm$^2$. The solid-state electrolyte film was positioned between two lithium metal foils. $Li_{1.3}Al_{0.3}Ti_{1.7}(PO_4)_3$ (LATP) was selected as the solid-state electrolyte material. The solid electrolyte film was freestanding and fabricated via electrospraying technique. The weight ratio of the electrolyte film comprising LATP, polycaprolactone, and poly (ethylene oxide) was 95:1:4. The thickness of the electrolyte film was about 30 µm. The electrochemical cell stack pressure was measured to be around 8 MPa. The polycaprolactone was electrosprayed in the outer region of the co-axial nozzle wherein LATP and poly (ethylene oxide) blend was electrosprayed in the core region, in an effort to coat the solid electrolyte and poly (ethylene oxide) blend with an ultrathin nanofilm comprising the polycaprolactone. The solid-state electrochemical cell was charged under a reactive gas (e.g., carbon dioxide) atmosphere to form a dendrite in and on the electrolyte material and then purged with an inert gas (e.g., argon) to displace the reactive gas.

With respect to the methods of the present disclosure, it should be appreciated that although the figures and description may illustrate a specific order of method steps, the order of such steps may differ from what is depicted and described, unless specified differently above. Also, two or more steps may be performed concurrently or with partial concurrence, unless specified differently above. Further, one or more steps can be repeated before a next step.

EXAMPLES

This section describes additional aspects and features of the disclosed electrolytes, electrochemical cells, and methods presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A1. A solid-state electrolyte, comprising a solid-state electrolyte material including one or more dendrites formed on and/or in the solid-state electrolyte material; wherein the one or more dendrites comprises a metal-containing dendrite material, where the metal-containing dendrite material additionally includes oxygen and/or sulfur.

A2. The solid-state electrolyte of paragraph A1, where the one or more dendrites is formed electrochemically and/or chemically on and/or in the solid-state electrolyte material under a reactive gas.

A3. The solid-state electrolyte of paragraph A1, wherein the metal-containing dendrite material includes an alkali metal or alkaline earth metal.

A4. The solid-state electrolyte of any of paragraphs A1-A3, wherein the solid-state electrolyte material includes a polymeric material at a concentration of less than about 30 wt. %.

A5. The solid-state electrolyte of any of paragraphs A1-A3, wherein the one or more dendrites exhibits an ionic conductivity of greater than or equal to $10^{-10}$ S/cm, and an electrical conductivity of less than or equal to $10^{-1}$ S/cm.

A6. The solid-state electrolyte of any of paragraphs A1-A3, wherein the one or more dendrites has at least one branch that exhibits an aspect ratio of greater than or equal to 0.1.

A7. A solid-state electrochemical cell that includes a solid-state electrolyte according to any of paragraphs A1-A3.

B1. A solid-state electrolyte, comprising a solid-state electrolyte material that is a metal-containing material having an ionic conductivity of greater than or equal to $10^{-8}$ S/cm and an electrical conductivity of less than or equal to $10^{-3}$ S/cm; wherein the solid-state electrolyte further comprises one or more dendrites formed on and/or in the solid-state electrolyte material; wherein the one or more dendrites comprise a dendrite material that includes an alkali metal, an alkaline earth metal, or an amphoteric metal; and further includes at least one of oxygen and sulfur.

B2. A7. A solid-state electrochemical cell that includes a solid-state electrolyte according to paragraph B1.

C1. A solid-state electrochemical cell comprising: an electrode comprising an electrode active material; and a solid-state dendritic electrolyte, including a solid-state electrolyte material and including one or more dendrites formed on and/or in the solid-state electrolyte material; where the one or more dendrites include a metal-containing compound that further includes at least one of oxygen and sulfur; and the solid-state dendritic electrolyte is in contact with the electrode.

C2. The solid-state electrochemical cell of paragraph C1, where the one or more dendrites are formed from the electrode active material.

C3. The solid-state electrochemical cell of any one of paragraphs C1 and C2, where the one or more dendrites have at least one branch extending perpendicular to the electrode; and at least one branch having an aspect ratio of greater than or equal to 0.1.

C4. The solid-state electrochemical cell of paragraph C1, where the one or more dendrites of the solid-state electrolyte make contact with the electrode, an additional electrode, and/or a current collector coupled to the electrode or the additional electrode.

C5. The solid-state electrochemical cell of one of paragraphs C1, C2, and C4, where the metal-containing compound includes an alkali or alkaline earth metal.

C6. The solid-state electrochemical cell of paragraph C1, wherein the electrode active material includes a metal or a metalloid.

C7. The solid-state electrochemical cell of paragraph C1, where the electrode includes an electrically-conductive material.

C8. The solid-state electrochemical cell of paragraph C7, where the electrically-conductive material is doped with one or more heteroatoms selected from boron, nitrogen, oxygen, sulfur, phosphorous, fluorine, chlorine, and bromine.

C9. The solid-state electrochemical cell of any one of paragraphs C1, C2, C4, and C6-C8, wherein the electrode includes one or more of a polymeric binder, a plasticizer, and a carboxylic acid.

C10. The solid-state electrochemical cell of any one of paragraphs C1, C2, C4, and C6-C8, where the solid-state electrolyte includes an electrosprayed film of a polymeric material.

C11. The solid-state electrochemical cell of any one of paragraphs C1, C2, C4, C6-C8, and C10, further comprising a current collector associated with the electrode or an additional electrode, wherein the current collector is metallic and includes one or more of molybdenum, titanium, and zirconium.

C12. The solid-state electrochemical cell of any one of paragraphs C1, C2, C4, C6-C8, and C10, further comprising a reactive gas that is liquified, in contact with the solid-state electrolyte, or dissolved in the solid-state electrolyte.

C13. The solid-state electrochemical cell of paragraph C12, where the reactive gas includes oxygen and/or sulfur.

C14. The solid-state electrochemical cell of paragraph C12, wherein the reactive gas includes one or more of $CO_2$, CO, $O_2$, $N_2O$, $NO_2$, $SO_2$, $S_8$, COS, $CS_2$, $SF_6$, $H_2S$, $SO_2$, $CH_3SH$, $(CH_3)_2S$, and $C_2H_5SH$.

CONCLUSION

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A solid-state electrolyte, comprising a solid-state electrolyte material including one or more dendrites formed on and/or in the solid-state electrolyte material; wherein the one or more dendrites comprises a metal-containing dendrite material, where the metal-containing dendrite material additionally includes oxygen and/or sulfur.

2. The solid-state electrolyte of claim 1, wherein the one or more dendrites is formed electrochemically and/or chemically on and/or in the solid-state electrolyte material under a reactive gas.

3. The solid-state electrolyte of claim 1, wherein the metal-containing dendrite material includes an alkali metal or alkaline earth metal.

4. The solid-state electrolyte of claim 1, wherein the solid-state electrolyte material includes a polymeric material at a concentration of less than about 30 wt. %.

5. The solid-state electrolyte of claim 1, wherein the one or more dendrites exhibits an ionic conductivity of greater than or equal to $10^{-10}$ S/cm, and an electrical conductivity of less than or equal to $10^{-1}$ S/cm.

6. The solid-state electrolyte of claim 1, wherein the one or more dendrites has at least one branch that exhibits an aspect ratio of greater than or equal to 0.1.

7. A solid-state electrolyte, comprising a solid-state electrolyte material that is a metal-containing material having an ionic conductivity of greater than or equal to $10^{-8}$ S/cm and an electrical conductivity of less than or equal to $10^{-3}$ S/cm; wherein the solid-state electrolyte further comprises one or more dendrites formed on and/or in the solid-state electrolyte material;
wherein the one or more dendrites comprise a dendrite material that includes an alkali metal, an alkaline earth metal, or an amphoteric metal; and further includes at least one of oxygen and sulfur.

8. A solid-state electrochemical cell comprising:
an electrode comprising an electrode active material; and
a solid-state dendritic electrolyte, including a solid-state electrolyte material and including one or more dendrites formed on and/or in the solid-state electrolyte material;
wherein the one or more dendrites include a metal-containing compound that further includes at least one of oxygen and sulfur; and
the solid-state dendritic electrolyte is in contact with the electrode.

9. The solid-state electrochemical cell of claim 8, wherein the one or more dendrites are formed from the electrode active material.

10. The solid-state electrochemical cell of claim 8, where the one or more dendrites have at least one branch extending perpendicular to the electrode; and at least one branch having an aspect ratio of greater than or equal to 0.1.

11. The solid-state electrochemical cell of claim 8, wherein the one or more dendrites of the solid-state electrolyte make contact with the electrode, an additional electrode, and/or a current collector coupled to the electrode or the additional electrode.

12. The solid-state electrochemical cell of claim 8, wherein the metal-containing compound includes an alkali or alkaline earth metal.

13. The solid-state electrochemical cell of claim 8, wherein the electrode active material includes a metal or a metalloid.

14. The solid-state electrochemical cell of claim 8, wherein the electrode includes an electrically-conductive material.

15. The solid-state electrochemical cell of claim 14, wherein the electrically-conductive material is doped with one or more heteroatoms selected from boron, nitrogen, oxygen, sulfur, phosphorous, fluorine, chlorine, and bromine.

16. The solid-state electrochemical cell of claim 8, wherein the electrode includes one or more of a polymeric binder, a plasticizer, and a carboxylic acid.

17. The solid-state electrochemical cell of claim 8, wherein the solid-state electrolyte includes an electrosprayed film of a polymeric material.

18. The solid-state electrochemical cell of claim 8, further comprising a current collector associated with the electrode or an additional electrode, wherein the current collector is metallic and includes one or more of molybdenum, titanium, and zirconium.

19. The solid-state electrochemical cell of claim 8, further comprising a reactive gas that is liquified, in contact with the solid-state electrolyte, or dissolved in the solid-state electrolyte.

20. The solid-state electrochemical cell of claim 19, wherein the reactive gas includes oxygen and/or sulfur.

21. The solid-state electrochemical cell of claim 20, wherein the reactive gas includes one or more of $CO_2$, $CO$, $O_2$, $N_2O$, $NO_2$, $SO_2$, $S_8$, $COS$, $CS_2$, $SF_6$, $H_2S$, $SO_2$, $CH_3SH$, $(CH_3)_2S$, and $C_2H_5SH$.

\* \* \* \* \*